United States Patent
Fukushima

[11] Patent Number: 5,999,313
[45] Date of Patent: Dec. 7, 1999

[54] OPTICAL DEVICE HAVING FUNCTION OF OPTICAL CIRCULATOR

[75] Inventor: Nobuhiro Fukushima, Kawasaki, Japan

[73] Assignee: Fujitsu Limited, Kawasaki, Japan

[21] Appl. No.: 08/864,952

[22] Filed: May 29, 1997

[30] Foreign Application Priority Data

Dec. 12, 1996 [JP] Japan ................................ 8-331883

[51] Int. Cl.$^6$ ............................................. G02B 5/30
[52] U.S. Cl. ........................ 359/484; 359/487; 359/495; 359/496; 385/11
[58] Field of Search ..................... 359/483, 484, 359/494, 495, 487, 496, 497, 501; 385/11; 372/703

[56] References Cited

U.S. PATENT DOCUMENTS

| | | | |
|---|---|---|---|
| 4,272,159 | 6/1981 | Matsumoto | 359/484 |
| 5,381,250 | 1/1995 | Meadows | 359/495 |
| 5,682,446 | 10/1997 | Pan et al. | 385/11 |
| 5,689,593 | 11/1997 | Pan et al. | 359/495 |
| 5,878,178 | 3/1999 | CHeng | 385/11 |

FOREIGN PATENT DOCUMENTS

| | | | |
|---|---|---|---|
| 0171314 | 10/1982 | Japan | 359/487 |
| 62-200319 | 9/1987 | Japan | 359/495 |
| 4-51013 | 2/1992 | Japan | 359/484 |
| 4-216522 | 8/1992 | Japan | G02B 27/28 |
| 95/18988 | 7/1995 | WIPO | G02F 1/09 |
| 97/05518 | 2/1997 | WIPO | G02B 27/28 |

OTHER PUBLICATIONS

Y. Fujii, "Polarization–Independent Optical Circulator Having High Isolation Over a Wide Wavelength Range", *IEEE Photonics Technology Letters*, vol. 4, No. 2, Feb. 1992, pp. 154–156.

Patent Abstracts of Japan, No. 04216522, Aug. 6, 1992 Nippon Telegr. & Teleph. "3 Terminal Optical Circulator".

Patent Abstracts of Japan No. 06258599, Sep. 16, 1994 Fuji Electrochem. "Three–Port Type Optical Circulator".

M. Shirasaki, et al., "A Compact Optical Polarization–Independent Optical Circulator"; The Transactions of the IECE of Japan, vol. E 64, No. 1, (Jan. 1981), pp. 30–31.

*Primary Examiner*—Cassandra Spyrou
*Assistant Examiner*—John Juba, Jr.
*Attorney, Agent, or Firm*—Staas & Halsey

[57] ABSTRACT

An optical device having a function of an optical circulator of which forward losses are uniformly small while reverse losses are uniformly great. The optical device applicable to be used as an improved three-port optical circulator has three optical coupling units connected optically to three ports respectively, a reflecting unit for giving a polarization plane rotation of 90° to an input beam, and a main polarization beam splitter having a polarized-wave separating film for optically connecting the optical coupling units and the reflecting unit through transmission and reflection. Each of the optical coupling units comprises a subsidiary polarization beam splitter and a polarization converter. The subsidiary polarization beam splitter couples the relevant port to first and second polarized beams perpendicular to each other. The polarization converter converts the polarization state of one of the first and second polarized beams in such a manner that the first and second polarized beams are transmitted through or reflected by the polarized-wave separating film in accordance with the directions of the beams.

12 Claims, 14 Drawing Sheets

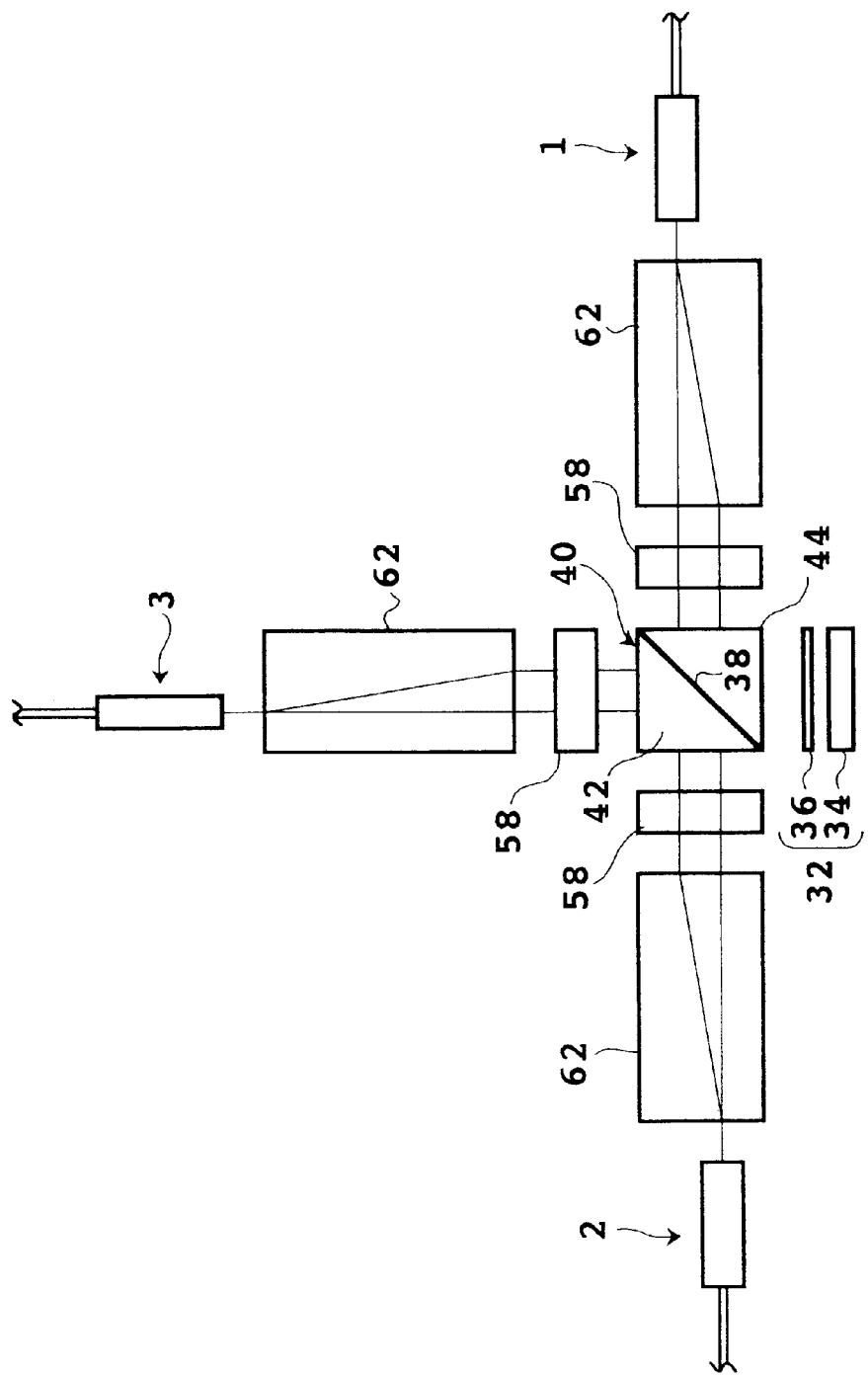

OPTICAL DEVICE HAVING FUNCTION OF OPTICAL CIRCULATOR

BACKGROUND OF THE INVENTION

1. Field of the Invention

The present invention relates generally to an optical device having a function of an optical circulator and, more particularly, to a three-port optical circulator of a novel structure, an optical add/drop circuit having the three-port circulator, and a four-port optical circulator of a novel structure.

2. Description of the Related Art

An exemplary four-port optical circulator known heretofore is disclosed in, for example, "A Compact Polarization-Independent Optical Circulator", THE TRANSACTIONS OF THE IECE OF JAPAN, Vol. E64, No. 1, January 1981, pp. 30–31. First a brief description will be given below on the structure and operation of the above four-port optical circulator with reference to FIG. 1. This optical circulator has four ports 1 to 4. And a triangular prism 6, a quadrangular prism 8, a quadrangular prism 12 and a triangular prism 10 are disposed opposite to the four ports 1 to 4, respectively. The prisms 6, 8, 10 and 12 are each composed of double refractive crystal such as rutile. The prisms 6 and 10 are mutually the same in shape, and also the prisms 8 and 12 are mutually the same in shape. The prisms 6 and 12 are fixed to each other via a thin air layer, and similarly the prisms 8 and 10 are fixed to each other via a thin air layer. A Faraday rotor 14, which is composed of magneto-optical crystal such as YIG and to which a magnetic field H is applied from an unshown magnet, and a half-wave plate 16, are disposed in this order between one set of the prisms 6 and 12 and another set of the prisms 8 and 10. The Faraday rotor 14 gives a 45° polarization plane rotation to an input beam clockwise with respect to the magnetic field H. The half-wave plate 16 gives a 45° polarization plane rotation to an input beam counterclockwise with respect to a direction of propagation of the input beam. Consequently, the set of the Faraday rotor 14 and the half-wave plate 16 gives a 90° polarization plane rotation to the beam which propagates leftward from the right in FIG. 1 while giving none of polarization plane rotation to the beam propagating rightward from the left in FIG. 1.

In this specification, an optical path from the port 1 toward the port 2 is termed a path (1, 2); an optical path from the port 2 toward the port 3 is termed a path (2, 3); an optical path from the port 3 toward the port 4 is termed a path (3, 4); and an optical path from the port 4 toward the port 1 is termed a path (4, 1). Contrary to the above, an optical path from the port 2 toward the port 1 is termed a path (2, 1); an optical path from the port 3 toward the port 2 is termed a path (3, 2); an optical path from the port 4 toward the port 3 is termed a path (4, 3); and an optical path from the port 1 toward the port 4 is termed a path (1, 4).

The paths (1, 2), (2, 3), (3, 4) and (4, 1) are in the forward direction, and it is demanded in each of the forward paths that the loss be minimum and not dependent on the state of polarization. Meanwhile the paths (2, 1), (3, 2), (4, 3) and (1, 4) are in the reverse direction, and it is demanded in each of the reverse paths that the loss is sufficiently great.

In FIG. 1, the path (1, 2) and the path (2, 3) will be explained below.

The beam supplied from the port 1 is separated, at a junction plane of the prisms 6 and 12, into an S polarized beam of reflected component and a P polarized beam of transmitted component. The S polarized beam is supplied to the prism 8 by way of the prism 6, the Faraday rotor 14 and the half-wave plate 16 in this order. Since the polarization state of this beam is not converted, the beam is reflected by the junction plane of the prisms 8 and 10 and then is outputted to the port 2. Meanwhile the P polarized beam is supplied to the prism 10 by way of the prism 12, the Faraday rotor 14 and the half-wave plate 16 in this order. Since the polarization state of this beam is not converted either, this beam is transmitted through the junction plane of the prisms 10 and 8 and then is outputted to the port 2.

The beam inputted to the port 2 is separated, at the junction plane of the prisms 8 and 10, into an S polarized beam and a P polarized beam. The S polarized beam is supplied to the prism 6 by way of the prism 8, the half-wave plate 16 and the Faraday rotor 14 in this order. Since this beam is given a 90° polarization plane rotation, it is transmitted through the junction plane of the prisms 6 and 12 and then is outputted to the port 3.

The P polarized beam is supplied to the prism 12 by way of the prism 10, the half-wave plate 16 and the Faraday rotor 14 in this order. Since this beam also is given a 90° polarization plane rotation, it is reflected by the junction plane of the prisms 12 and 6 and then is outputted to the port 3.

As it will be understood that a similar operation is performed with regard to any of the other paths, an explanation thereof is omitted here.

Recently, there is proposed an optical add/drop circuit having of a combination of an optical circulator and a fiber grating. A fiber grating reflects light of a specific narrow band while transmitting light of any other wavelength outside of such a band. As will be described later, an optical add/drop circuit for practical use is to be equipped with a three-port optical circulator. For example, in providing a three-port optical circulator by the use of a four-port optical circulator as shown in FIG. 1, a process of total reflection may be executed with respect to the port 4. In this case, however, the forward optical path from the port 3 toward the port 1 includes the paths (3, 4) and (4, 1), so that theoretically the forward loss becomes more than double. Further, since the reverse optical path from the port 1 toward the port 3 includes the total reflection plane (port 4), the reflected component based on the input beam to the port 3 is outputted therefrom to consequently deteriorate the characteristic.

An exemplary three-port optical circulator is disclosed in Japanese Patent Laid-open No. Hei 4-216522. In this optical circulator, there exists a problem that some difficulties are unavoidable in manufacture due to the necessity of mutually reversing the rotational directions of polarization planes of two Faraday rotors which are disposed at relatively proximate positions.

SUMMARY OF THE INVENTION

It is therefore an object of the present invention to provide an optical device having a function of an optical circulator (particularly a three-port optical circulator) where the forward losses are uniformly small while the reverse losses are uniformly great.

Another object of the present invention resides in providing an optical device having a function of an optical circulator (particularly a three-port optical circulator) with minimal reflected component.

And a further object of the present invention is to provide an optical circulator manufacturable with facility.

According to one aspect of the present invention, there is provided an optical device having first to third ports. This optical device comprises first to third optical coupling units connected optically to the first to third ports, respectively; a reflecting unit for giving a polarization plane rotation of 90° to an input beam; and a main polarization beam splitter having a polarized-wave separating film for optically connecting the first to third optical coupling units to the reflecting unit through transmission and reflection. Each of the first to third optical coupling units comprises a subsidiary polarization beam splitter for coupling the individual relevant port to a first polarized beam having a first polarization plane and also to a second polarized beam having a second polarization plane perpendicular to the first polarization plane; and a means for polarization-converting one of the first and second polarized beams in such a manner that the first and second polarized beams are transmitted through the polarized-wave separating film in the direction from the first optical coupling unit toward the second optical coupling unit and also in the direction from the third optical coupling unit toward the reflecting unit, but the first and second polarized beams are reflected by the polarized-wave separating film in the direction from the second optical coupling unit toward the third optical coupling unit and also in the direction from the reflecting unit toward the first optical coupling unit.

Out of the optical path from the first port toward the second port, the optical path from the second port toward the third port and another optical path from the third port toward the first port in the present invention, only one optical path from the third port toward the first port includes the reflecting unit. However, since the loss caused by the reflecting unit can be sufficiently minimized, it becomes possible to provide an improved three-port optical circulator where the forward losses are rendered uniformly small and not dependent on the polarization state of the input. The reflecting unit may be composed of, e.g., a quarter-wave plate and a mirror. Meanwhile the losses in the reverse optical paths are uniformly great as the main polarization beam splitter is common to each of the optical paths.

According to another aspect of the present invention, there is provided an optical device having first to fourth ports. This optical device comprises first to fourth optical coupling units connected optically to the first to fourth ports, respectively; and a main polarization beam splitter having a polarized-wave separating film for optically connecting the first to fourth optical coupling units through transmission and reflection. In this device, each of the first to fourth optical coupling units comprises a subsidiary polarization beam splitter for coupling the individual relevant port to a first polarized beam having a first polarization plane and also to a second polarized beam having a second polarization plane perpendicular to the first polarization plane; and a means for polarization-converting one of the first and second polarized beams in such a manner that the first and second polarized beams are transmitted through the polarized-wave separating film in the direction from the first optical coupling unit toward the second optical coupling unit and also in the direction from the third optical coupling unit toward the fourth optical coupling unit, but the first and second polarized beams are reflected by the polarized-wave separating film in the direction from the second optical coupling unit toward the third optical coupling unit and also in the direction from the fourth optical coupling unit toward the first optical coupling unit.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 7 is a diagram showing a second embodiment of the three-port optical circulator of the present invention;

DETAILED DESCRIPTION OF THE PREFERRED EMBODIMENTS

Figure 1:
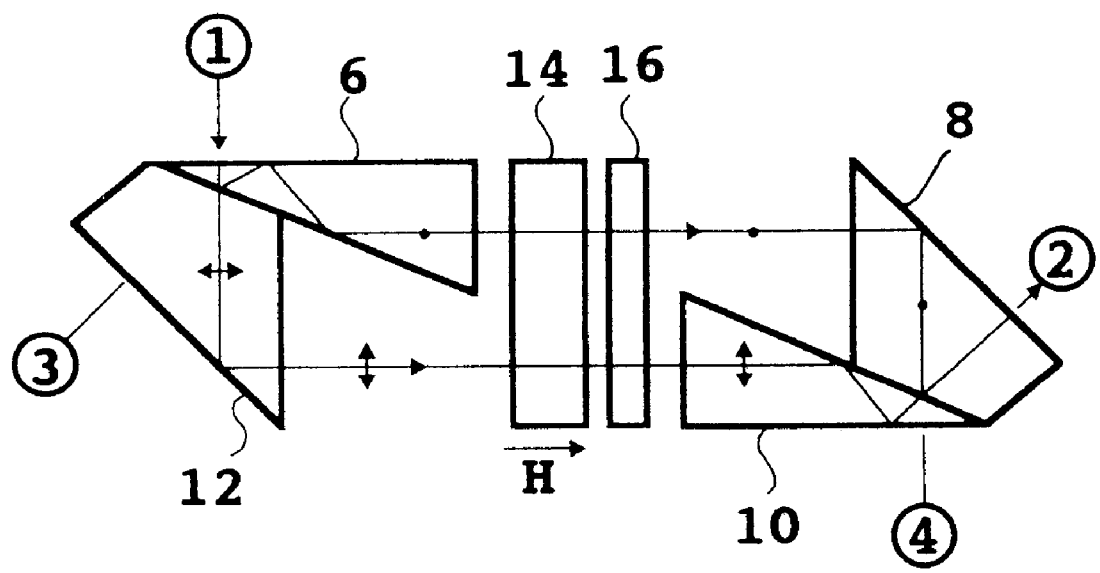
FIG. 1 is a schematic diagram showing a prior art of a four-port optional circulator.

Hereinafter some preferred embodiments of the present invention will be described in detail with reference to the accompanying drawings. In the entire drawings, substantially like components are denoted by like reference numerals.

Figure 2:
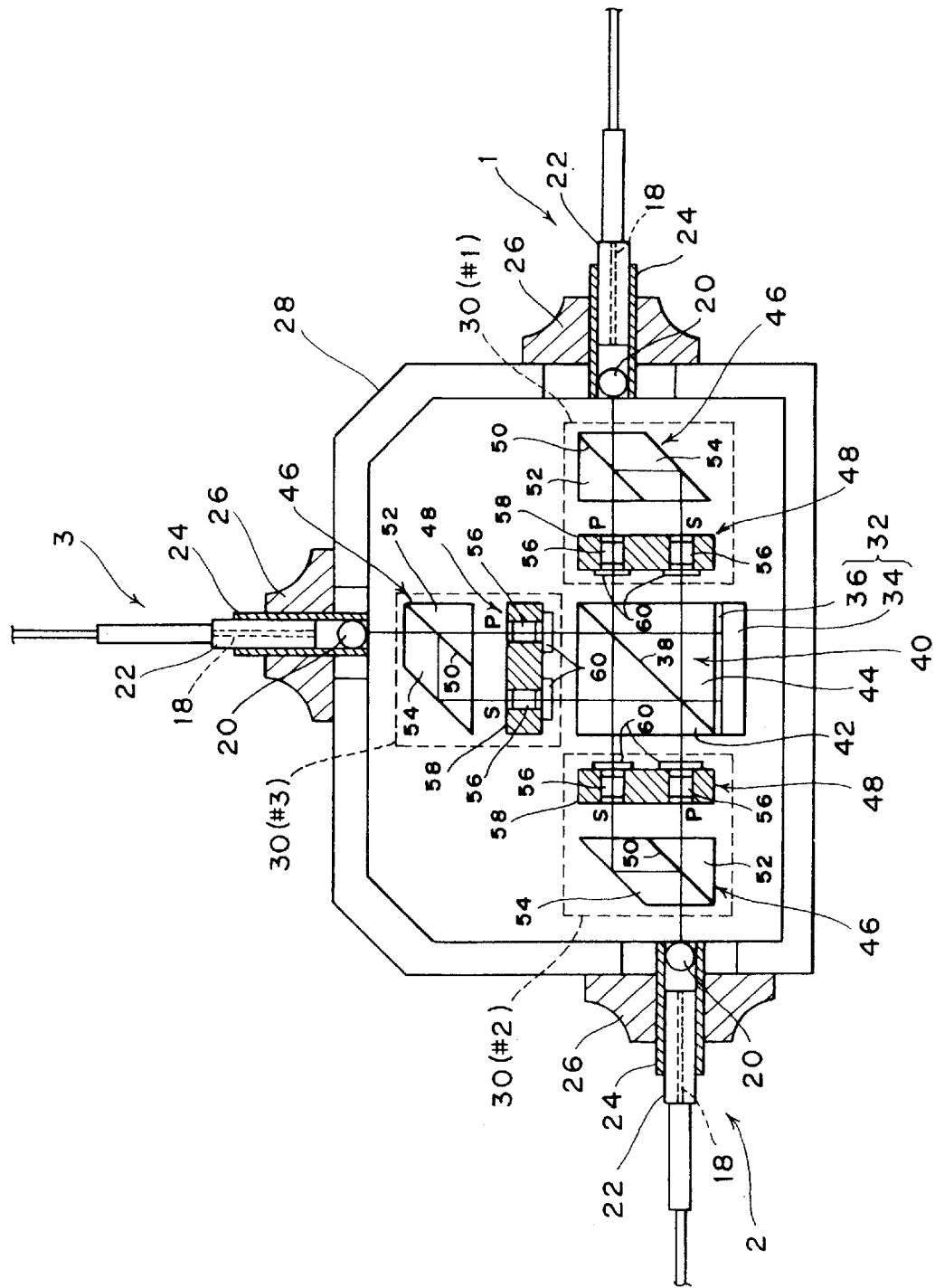
FIG. 2 is a partially sectional view showing a first embodiment of a three-port optical circulator.

FIG. 2 is a partially sectional view of a first embodiment representing the three-port optical circulator of the present invention. This optical circulator has ports 1, 2 and 3. Each of the ports is equipped with an optical fiber 18 having an exciting end, and a lens 20 disposed opposite to the exciting end of the optical fiber 18. The optical fiber 18 is inserted in and fixed to a ferrule 22, and both the ferrule 22 and the lens 20 are inserted in and fixed to a sleeve 24, which is fixed to a housing 28 via a flange 26. In this embodiment, the housing 28 is shaped to be a rectangular parallelepiped substantially, and the ports 1, 2 and 3 are formed in openings defined respectively on three walls of the housing 28.

In the housing 28, there are disposed optical coupling units 30 (#1, #2 and #3) connected optically to the ports 1, 2 and 3 respectively, a reflecting unit 32 for giving a polarization plane rotation of 90° to an input beam, and a main polarization beam splitter 40 with a polarized-wave separating film 38 for optically connecting the units 30 (#1, #2 and #3) and 32 through transmission and reflection. In this embodiment, the polarized-wave separating film 38 is supported by a pair of triangular prisms (right-angled triangular prisms) 42 and 44 while being held between the inclined planes thereof. And the reflecting unit 32 consists of a mirror 34 and a quarter-wave plate 36 interposed between the mirror 34 and the prism 44.

Each of the optical coupling units 30 (#1, #2 and #3) has a subsidiary polarization beam splitter 46 and a polarization converter unit 48. The subsidiary polarization beam splitter 46 couples the relevant port 1, 2 or 3 to a first polarized beam (P polarized beam) having a first polarization plane and also to a second polarized beam (S polarized beam) having a second polarization plane perpendicular to the first polarization plane. For this purpose, the subsidiary polarization beam splitter 46 has a polarized-wave separating film 50, a triangular prism (right-angled triangular prism) 52 and a parallelogrammic prism 54 to hold the polarized-wave separating film therebetween. Here the first and second polarized beams are defined with respect to the incidence plane of each polarized-wave separating film 50. More concretely, the first polarization plane is parallel to the drawing paper face, and the second polarization plane is perpendicular thereto. Since the parallelogrammic prism 54 is used in this device, the first and second polarized beams are parallel to each other, so that the units can be optically coupled with facility.

Each of the polarization converter units 48 has a function of two-channel polarization conversion relative to the first and second polarized beams. For this purpose, each polarization converter unit 48 comprises two magneto-optical crystals 56, permanent magnets 58 for applying magnetic fields to both of the magneto-optical crystals 56 in the same direction, and two half-wave plates 60 disposed opposite to the magneto-optical crystals 56 respectively. The magneto-optical crystal 56 may be composed of YIG (yttrium-iron-garnet). The direction of an optic axis of the half-wave plate 60 will be described later. In each channel of the polarization converter units 48, the beam propagating in one direction is given a polarization plane rotation of 90°, while the beam propagating in the other direction is given either no polarization plane rotation or a rotation of 180°. In the shown example, the half-wave plate 60 is disposed between each magneto-optical crystal 56 and the main polarization-beam splitter 40. However, the magneto-optical crystal 56 and the half-wave plate 60 may be disposed at reverse positions in regard to the main polarization beam splitter 40.

Each of the polarization converter units 48 executes a process of polarization-converting one of the first and second polarized beams in such a manner that the first and second polarized beams are transmitted through the polarized-wave separating film 38 in the direction from the optical coupling unit 30 (#1) toward the optical coupling unit 30 (#2) and also in the direction from the optical coupling unit 30 (#3) toward the reflecting unit 32, but first and second polarized beams are reflected by the polarized-wave separating film 38 in the direction from the optical coupling unit 30 (#2) toward the optical coupling unit 30 (#3) and also in the direction from the reflecting unit 32 toward the optical coupling unit 30 (#1).

In this embodiment where each of the ports 1, 2 and 3 has a lens 20 opposite to the exciting end of the optical fiber 18, each of the paths (1, 2), (2, 3) and (3, 1) can be provided by a collimate beam system.

Figure 4:
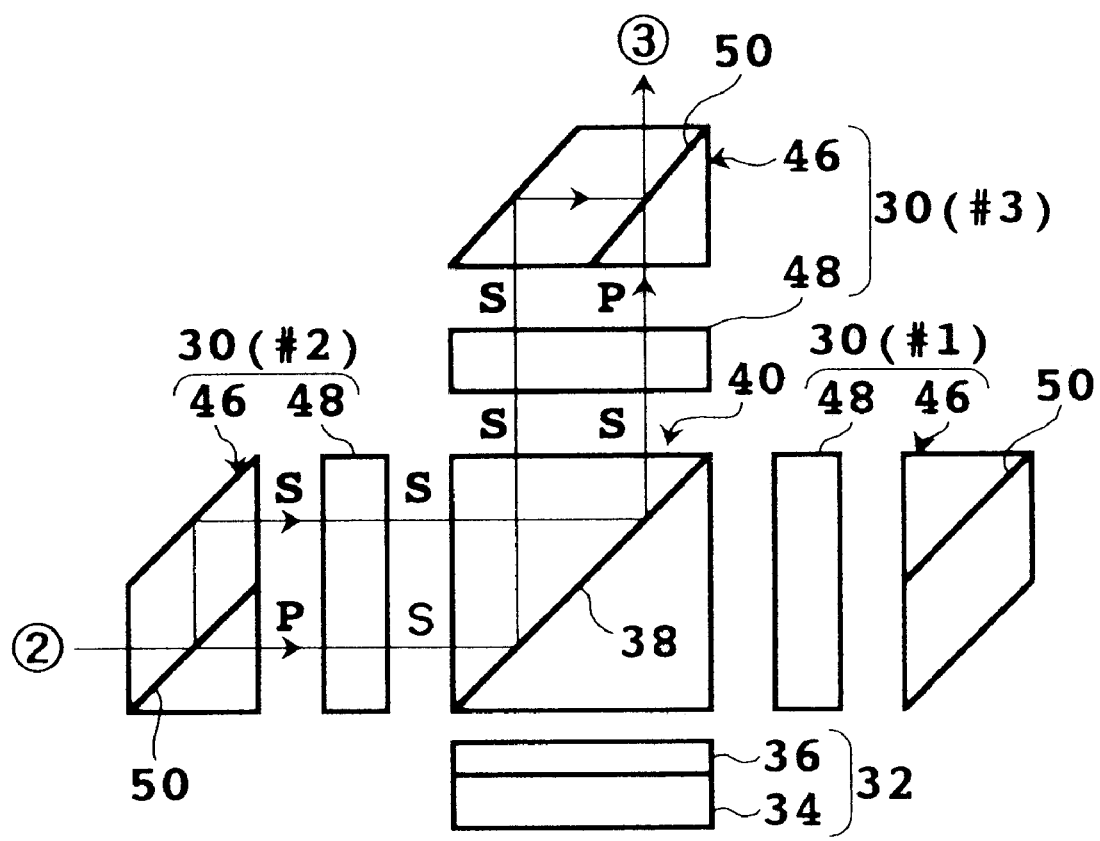
Figure 5:
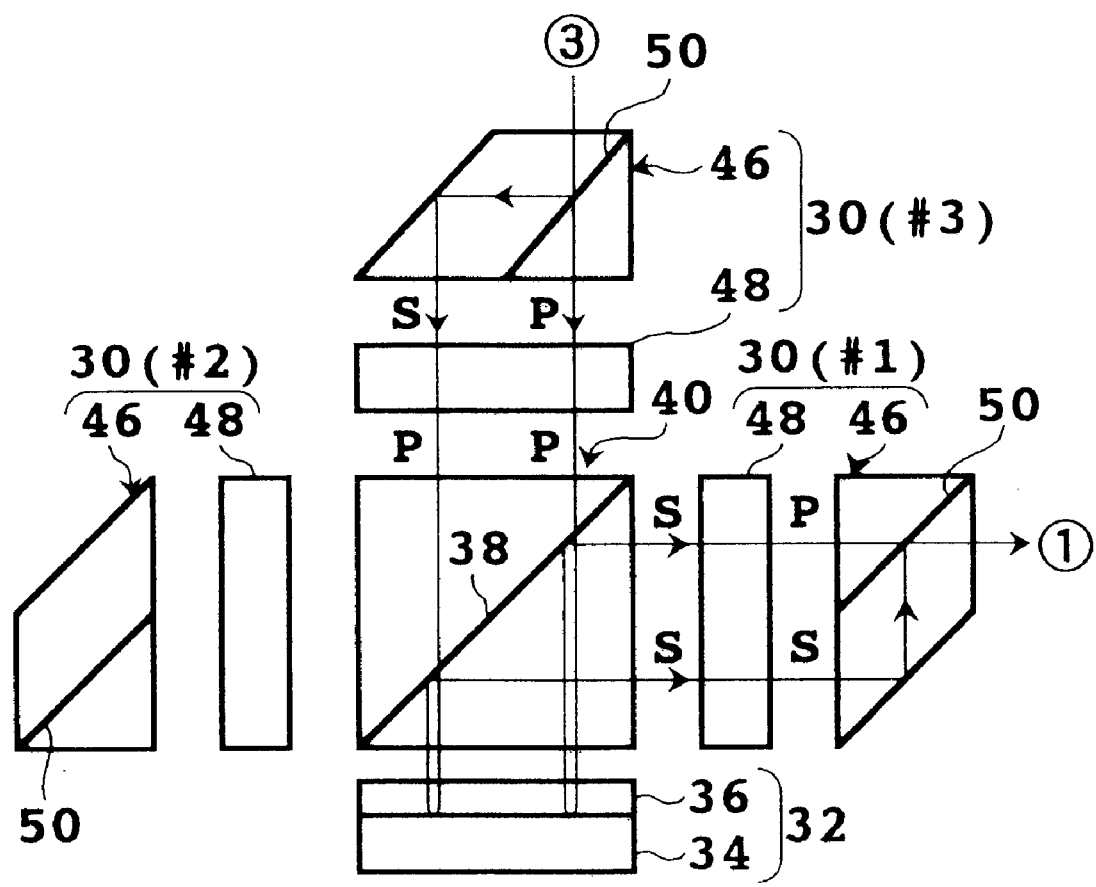

Now the operation of the three-port optical circulator shown in FIG. 2 will be described below with reference to FIGS. 3 to 5.

Figure 3:
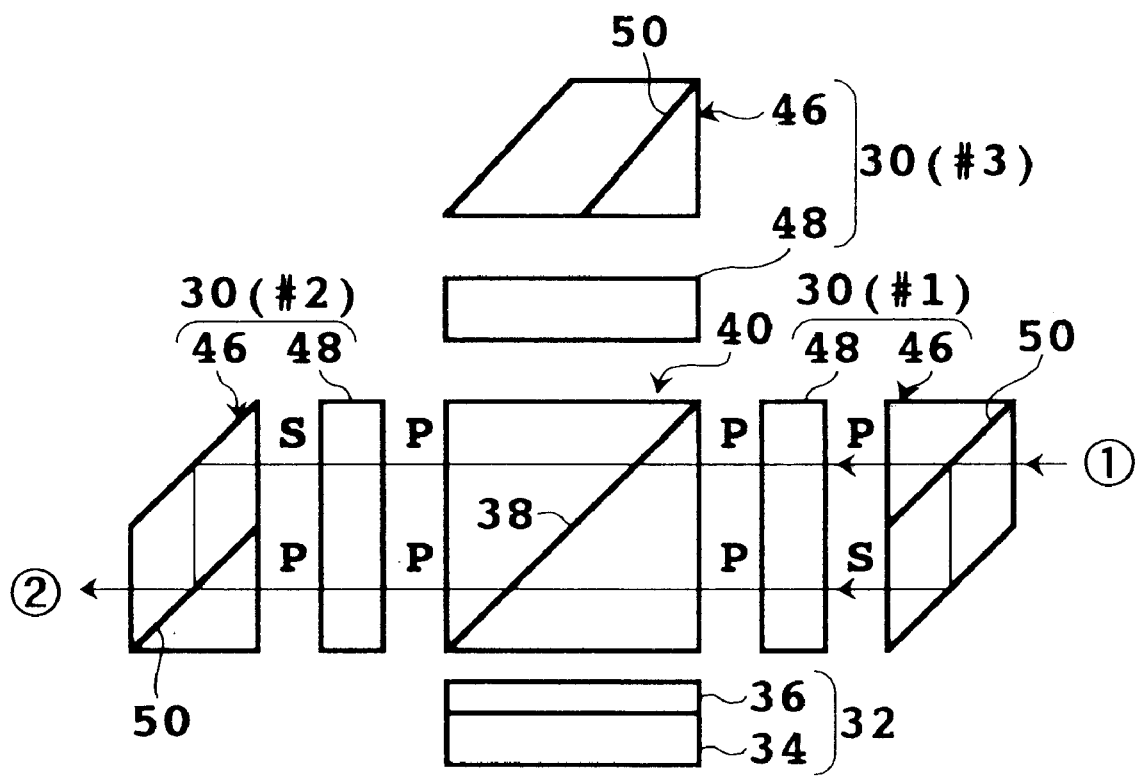
FIGS. 3 to 5 are explanatory diagrams of the operation in the first embodiment.

Referring first to FIG. 3, an explanation will be given on the path (1, 2). The beam from the port 1 is separated into a P polarized beam and an S polarized beam by the polarized-wave separating film 50 of the optical coupling unit 30 (#1). The P polarized beam and the S polarized beam are then outputted in parallel with each other from the subsidiary polarization beam splitter 46. When transmitting through the polarization converter unit 48 leftward from the right in FIG. 3, the P polarized beam is not given any polarization plane rotation and then is supplied to the main polarization beam splitter 40 while being left unchanged as the P polarized beam. Meanwhile, when transmitting through the polarization converter unit 48 leftward from the right in FIG. 3, the S polarized beam is given a polarization plane rotation of 90° to be thereby converted to a P polarized beam, which is then supplied to the main polarization beam splitter 40. The two P polarized beams thus supplied to the main polarization beam splitter 40 are transmitted through the polarized-wave separating film 38. One P polarized beam is converted to an S polarized beam by the polarization converter unit 48 of the optical coupling unit 30 (#2), and subsequently the S polarized beam is reflected by the polarized-wave separating film 50 and then is coupled to the port 2. Meanwhile the other P polarized beam is not given any polarization plane rotation when transmitting through the polarization converter unit 48 leftward from the right in the drawing, so that it is transmitted through the polarized-wave separating film 50 while being left unchanged as the P polarized beam and then is coupled to the port 2.

Thus, theoretically, the power of the beam supplied to the port 1 is entirely outputted from the port 2, so that the loss caused in the path (1, 2) is not dependent on the polarization state of the beam supplied to the port 1.

Next, the path (2, 3) will be explained below with reference to FIG. 4. The beam from the port 2 is separated by the subsidiary polarization beam splitter 46 of the optical coupling unit 30 (#2) into a P polarized beam transmitted through the polarized-wave separating film 50 and an S polarized beam reflected by the film 50, and then such P polarized beam and S polarized beam are outputted in parallel with each other from the subsidiary polarization beam splitter 46. When transmitting through the polarization converter unit 48 of the optical coupling unit (#2), the P polarized beam is given a polarization plane rotation of 90° to be thereby converted to an S polarized beam, which is then supplied to the main polarization beam splitter 40. When transmitting through the polarization converter unit 48 rightward from the left in FIG. 4, the S polarized beam from the subsidiary polarization beam splitter 46 is not given any polarization plane rotation and is supplied to the main polarization beam splitter 40 while being left unchanged as the S polarized beam. The two S polarized beams supplied to the main polarization beam splitter 40 are reflected by the polarized-wave separating film 38 respectively and then are supplied to the optical coupling unit 30 (#3). When transmitting through the polarization converter unit 48 of the optical coupling unit 30 (#3) upward from below in FIG. 4, one S polarized beam from the main polarization beam splitter 40 is not given any polarization plane rotation and is supplied to the subsidiary polarization beam splitter 46 while being left unchanged as the S polarized beam, which is reflected by the polarized-wave separating film 50 and then is coupled to the port 3. When transmitting through the polarization converter unit 48 of the optical coupling unit 30 (#3) upward from below in FIG. 4, the other S polarized beam from the main polarization beam splitter 40 is given a polarization plane rotation of 90° to be thereby converted to a P polarized beam, which then is transmitted through the polarized-wave separating film 50 and is coupled to the port 3.

Thus, theoretically, the power of the beam supplied to the port 2 is entirely outputted from the port 3, so that the loss caused in the path (2, 3) is not dependent on the polarization state of the beam supplied to the port 2.

Now the path (3, 1) will be explained below with reference to FIG. 5. The beam from the port 3 is separated by the subsidiary polarization beam splitter 46 of the optical coupling unit 30 (#3) into a P polarized beam transmitted through the polarized-wave separating film 50 and an S polarized beam reflected by the film 50, and then such P polarized beam and S polarized beam are outputted in parallel with each other from the subsidiary polarization beam splitter 46. When transmitting through the polarization converter unit 48 of the optical coupling unit (#3) downward from above in FIG. 5, the S polarized beam is given a polarization plane rotation of 90° to be thereby converted to a P polarized beam, which is then supplied to the main polarization beam splitter 40. When transmitting through the polarization converter unit 48 upward from below in FIG. 5, the P polarized beam from the subsidiary polarization beam splitter 46 is not given any polarization plane rotation and is supplied to the main polarization beam splitter 40 while being left unchanged as the P polarized beam. The two P polarized beams supplied to the main polarization beam splitter 40 are transmitted through the polarized-wave separating film 38 respectively and then are supplied to the reflecting unit 32. Each of the P polarized beams becomes circular polarized beam after transmission thereof through the quarter-wave plate 36 downward from above in FIG. 5, and subsequently such circular polarized beams are reflected by the mirror 34 and then are transmitted through the quarter-wave plate 36 again upward from below to thereby become linear polarized output beams. Since the reflecting unit 32 gives a polarization plane rotation of 90° to an input beam, each of the beams supplied from the reflecting unit 32 to the main polarization beam splitter 40 is turned to an S polarized beam. The two S polarized beams supplied from the reflecting unit 32 to the main polarization beam splitter 40 are reflected by the polarized-wave separating film 38 and then are supplied to the optical coupling unit 30 (#1). When transmitting through the polarization converter unit 48 of the optical coupling unit 30 (#1) rightward from the left in FIG. 5, one S polarized beam supplied from the main polarization beam splitter 40 is given a polarization plane rotation of 90° to be thereby converted to a P polarized beam, which then is transmitted through the polarized-wave separating film 50 and is coupled to the port 1. When transmitting through the polarization converter unit 48 of the optical coupling unit 30 (#1) rightward from the left in FIG. 5, the other S polarized beam supplied from the main polarization beam splitter 40 is not given any polarization plane rotation and is supplied to the subsidiary polarization beam splitter 46 while being left unchanged as the S polarized beam. Subsequently the S polarized beam thus supplied is reflected by the polarized-wave separating film 50 and then is coupled to the port 1.

Thus, theoretically, the power of the beam supplied to the port 3 is entirely outputted from the port 1, so that the loss caused in the path (3, 1) is not dependent on the polarization state of the beam supplied to the port 3.

In comparison of the path (3, 1) with the paths (1, 2) and (2, 3), it is prone to be supposed that the forward loss therein increases by an amount corresponding to the inclusion of the reflecting unit 32. However, since the loss in the reflecting unit 32 can be sufficiently minimized for practical use, this embodiment is adapted for providing an improved three-port optical circulator where the forward losses are uniformly small.

As this optical circulator has merely three ports 1, 2 and 3, it is possible to reduce the reflected component in comparison with the conventional case of providing a three-port optical circulator by the use of a four-port optical circulator.

Figure 6:
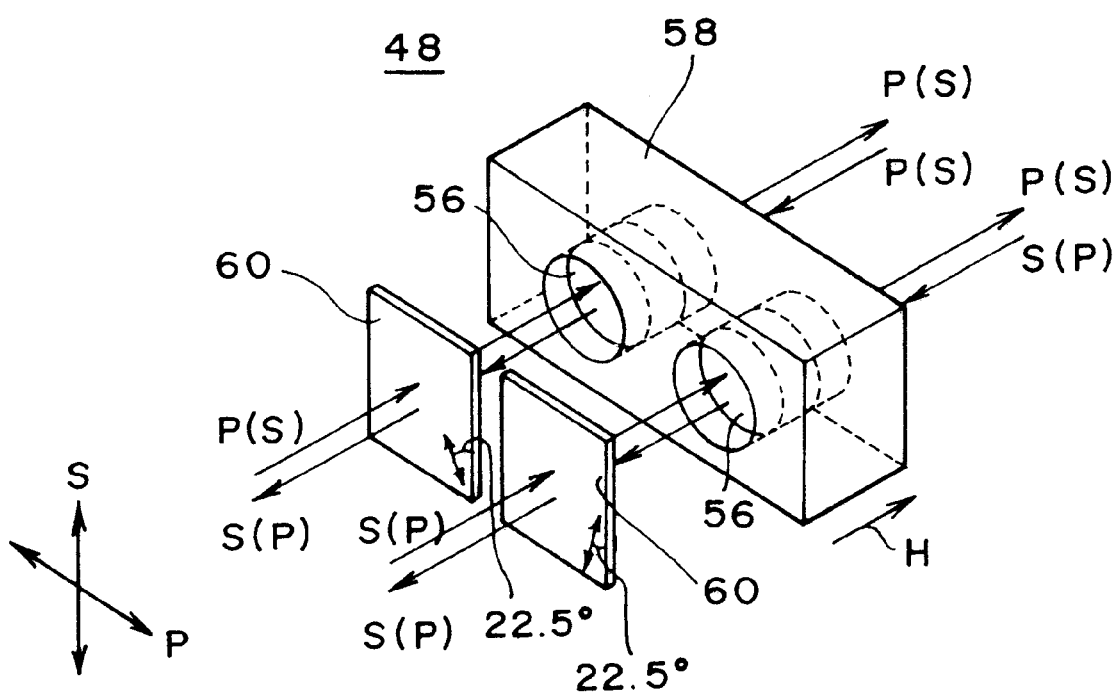
FIG. 6 is an explanatory diagram of the operation in a polarization convetcer unit applicable to the present invention.

Referring now to FIG. 6, there is shown an explanatory diagram which illustrates the operation of a polarization converter unit applicable to the present invention. The optic axes of two half-wave plates 60 for use in a single polarization converter unit 48 are so set as to form an angle of 45° More specifically, in the shown example where the direction of a magnetic field applied from a permanent magnet 58 to each of magneto-optical crystals 56 is denoted by an arrow H, the optic axis of the right half-wave plate 60 in FIG. 6 is inclined by an angle of 22.5° clockwise in the direction of the arrow H to the polarization plane of the S polarized beam, while the optic axis of the left half-wave plate 60 is inclined by an angle of 22.5° counterclockwise in the direction of the arrow H to the polarization plane of the S polarized beam.

First, an explanation will be rendered with regard to the polarization plane rotation given by the right half-wave plate 60 and the magneto-optical crystal 56 corresponding thereto. In this case, a polarization plane rotation of 90° is given to the beam transmitted through the half-wave plate 60 and the magneto-optical crystal 56 in this order, while no polarization plane rotation is given to the beam transmitted through the magneto-optical crystal 56 and the half-wave plate 60 in this order.

Next, an explanation will be rendered with regard to the polarization plane rotation given by the left half-wave plate 60 and the magneto-optical crystal 56 corresponding thereto. In this case, no polarization plane rotation is given to the beam transmitted through the half-wave plate 60 and the magneto-optical crystal 56 in this order, while a polarization plane rotation of 90° is given to the beam transmitted through the magneto-optical crystal 56 and the half-wave plate 60 in this order.

In this embodiment, the requirement can be satisfied by applying magnetic fields from one permanent magnet 58 to two magneto-optical crystals 56 in the same direction, hence facilitating manufacture of the polarization converter unit 48. Furthermore, since the two magneto-optical crystals 56 can be positioned in the proximity to each other, it becomes possible to attain a dimensional reduction. In this manner, according to the above embodiment, it is possible to provide an improved three-port optical circulator which is producible with more facility in comparison with the conventional one and is adapted to realize smaller structural dimensions.

In FIG. 6, the input and output relationship of the two channels can be reversed by reversing the direction H of the magnetic field applied from the permanent magnet 58 to each of the magneto-optical crystals 56.

FIG. 7 shows a second embodiment of the three-port optical circulator of the present invention. In this diagram, the flanges 26 and the housing 28 shown in FIG. 2 are omitted. The second embodiment is characterized in that a subsidiary polarization beam splitter 62 consisting of a double refraction plate is used instead of the aforementioned subsidiary polarization beam splitter 46 with the polarized-wave separating film 50 shown in FIG. 2.

Figure 8A:
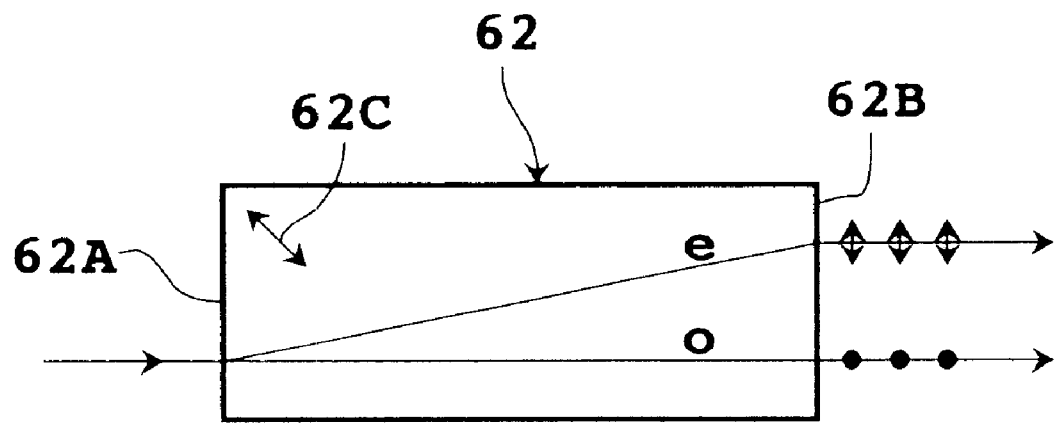
FIGS. 8A and 8B are explanatory diagrams of the operation in a subsidiary polarization beam splitter consisting of a double refraction plate.
Figure 8B:
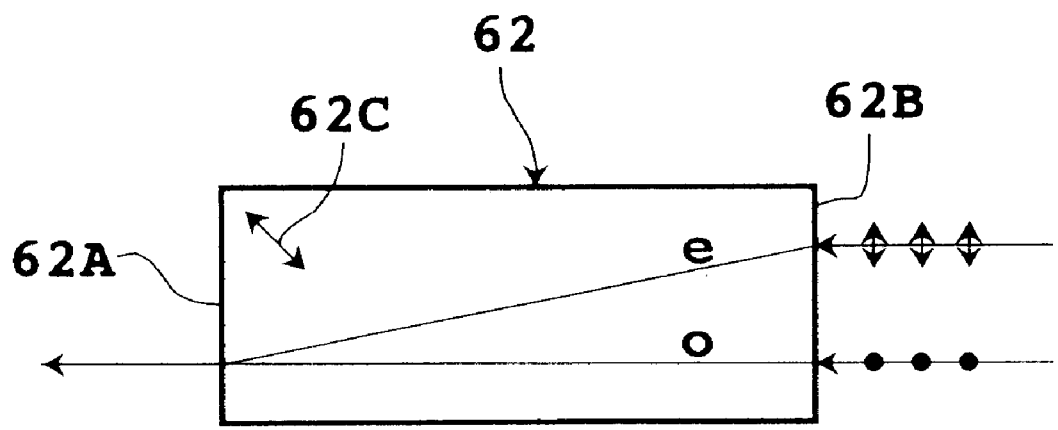

The operation of each subsidiary polarization beam splitter 62 will now be described below with reference to FIGS. 8A and 8B. Each subsidiary polarization beam splitter 62 has an end face 62A opposed to a relevant port 1, 2 or 3, and an end face 62B opposed to a main polarization beam splitter 40. The two end faces 62A and 62B are parallel with each other. The optic axis 62C of the subsidiary polarization beam splitter 62 is so set as to be inclined by an angle of 45° to the end faces 62A and 62B and to be parallel with the drawing paper face. As illustrated in FIG. 8A, when a polarized beam is supplied to the end face 62A, the beam is split into an ordinary light component (o) and an extraordinary light component (e), which are then outputted in parallel with each other from mutually different positions of the end face 62B. Contrary to the above, when two beams corresponding respectively to the ordinary light component (o) and the extraordinary light component (e) are supplied to the end face 62B as illustrated in FIG. 8B, such two beams are combined with each other and then are outputted as one beam from the end face 62A. The ordinary light component (o) has a polarization plane perpendicular to the drawing paper face, while the extraordinary light component (e) has a polarization plane parallel with the drawing paper face, so that an exact apprehension of the operation of the second embodiment in FIG. 7 will be attained with facility by supposing that the first polarized beam and the second polarized beam in the first embodiment correspond respectively to the extraordinary light component (e) and the ordinary light component (o).

According to the second embodiment of FIG. 7 also, it becomes possible to provide an improved three-port optical circulator where the forward losses are uniformly small and the reflected component is minimized. Further, since the polarization converter unit shown in FIG. 6 is employed as each of the polarization converter units 58, it is possible to provide an improved optical circulator adapted to realize reduced structural dimensions and manufacturable with ease. Moreover, separation of polarized beams in each of the subsidiary polarization beam splitters 62 is performed by the physical property itself of the double refraction plate, so that an extremely superior extinction ratio (e.g., more than 60dB) can be achieved in comparison with the known case of using a polarized-wave separating film which consists of a dielectric multilayer film or the like.

Figure 9:
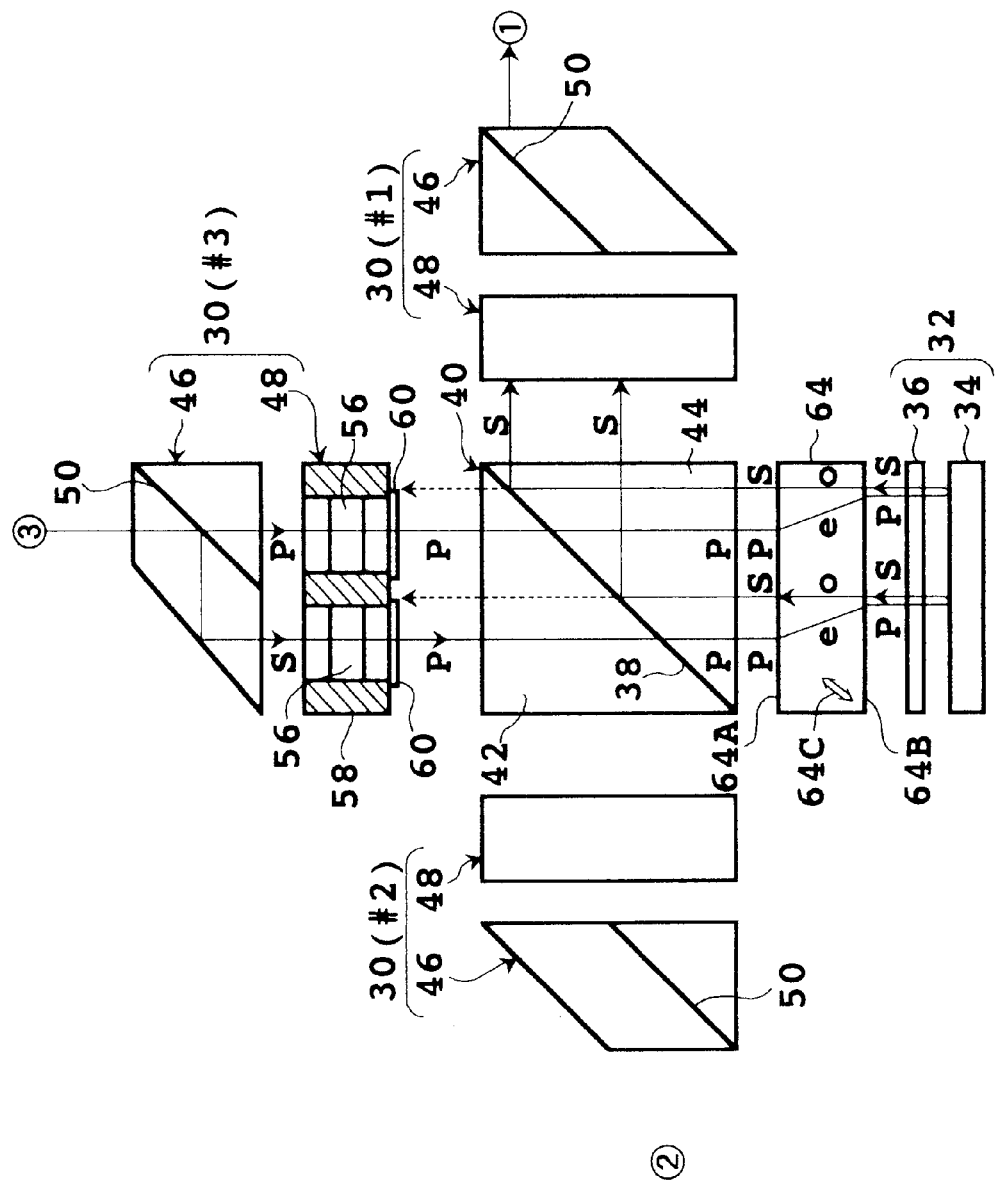
FIG. 9 is a diagram showing a third embodiment of the three-port optical circulator of the present invention.

FIG. 9 shows a third embodiment of the three-port optical circulator of the present invention. As compared with the aforementioned first embodiment, the third embodiment is characterized in that a double refraction plate 64 is disposed between the main polarization beam splitter 40 and the reflecting unit 32. Due to this configuration, the reverse loss is rendered sufficiently great to consequently attain a high extinction ratio. Its detailed concrete configuration is as follows.

The double refraction plate 64 has an end face 64A opposed to the main polarization beam splitter 40 and an end face 64B opposed to the quarter-wave plate 36. The two end faces 64A and 64B are parallel with each other. The optic axis 64C of the double refraction plate 64 is so set as to be inclined by an angle of 45° to the end faces 64A and 64B and to be parallel with the drawing paper face. The reason for using the double refraction plate 64 in the third embodiment resides in deviating the beams, which travels from the reflecting unit 32 toward the main polarization beam splitter 40, from the beams traveling from the main polarization beam splitter 40 toward the reflecting unit 32.

Assuming that the polarized-wave separating film 38 has ideal characteristics, the effect achieved due to the double refraction plate 64 is little. Practically, however, the polarized-wave separating film 38 causes slight reflection of the P polarized beam while causing slight transmission of the S polarized beam. Accordingly, if the double refraction plate 64 is not existent, there may arise a problem that the S polarized beam supplied from the reflecting unit 32 to the main polarization beam splitter 40 are transmitted slightly through the polarized-wave separating film 38 and then returns to the port 3 to consequently deteriorate the extinction ratio.

In the third embodiment, each P polarized beam from the main polarization beam splitter 40 is incident as an extraordinary light component (e) upon the double refraction plate 64. Since this extraordinary light component (e) is converted into an ordinary light component (o) by the reflecting unit 32, the incidence point of the extraordinary light component (e) on the end face 64A and the output point of the ordinary light component (o) are positionally different from each other. Each of the ordinary light components (o) is reflected by the polarized-wave separating film 38 and then is coupled to the port 1 by the optical coupling unit 30 (#1). Even if some S polarized beams are transmitted through the polarized-wave separating film 38 upward from below in FIG. 9, such beams are not coupled to the port 3 by the optical coupling unit 30 (#3), so that the extinction ratio is maintained to be satisfactory.

Figure 10:
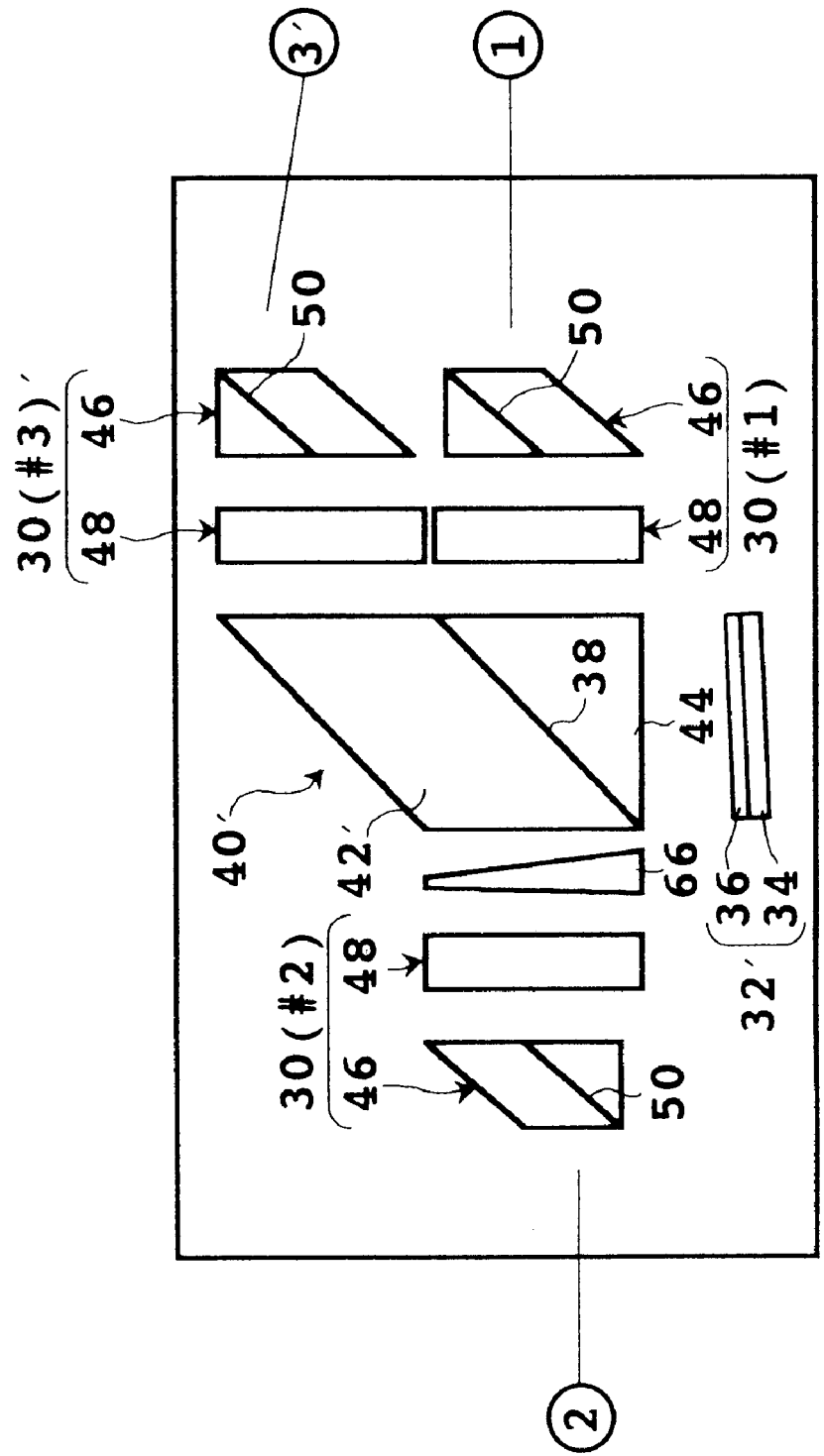
FIG. 10 is a diagram showing a fourth embodiment of the three-port optical circulator of the present invention.

FIG. 10 shows a fourth embodiment of the three-port optical circulator of the present invention. In this embodiment, for the purpose of raising the extinction ratio, a double refraction wedge plate 66 is interposed between the optical coupling unit 30 (#2) and a main polarization beam splitter 40', and therefore a reflecting unit 32' is disposed with a slight inclination. In order to position a port 3' on the same side as a port 1 with respect to the main polarization beam splitter 40', the main polarization beam splitter 40' has a polarized-wave separating film 38 and also a triangular prism 44 and a parallelogrammic prism 42' to hold the polarized-wave separating film 38 therebetween. For this reason, an optical coupling unit 30 (#3)' is positionally changed. In the shown example, the plane, where the wedge angle of the double refraction wedge plate 66 is defined, is parallel with the drawing paper face, and in this case, the optic axis of the double refraction wedge plate 66 is set to be perpendicular to the drawing paper face. In this example, the material of the double refraction wedge plate 66 is rutile, and when the wedge angle is 4°, the port 3' is inclined approximately by an angle of 1° to the ports 1 and 2, while a reflecting unit 32' is inclined approximately by an angle of 0.50 to the ports 1 and 2.

Although not shown, a polarization dispersion can be reduced by disposing the double refraction wedge plate 66 in such a manner that the wedge angle of the double refraction wedge plate 66 is defined on a plane perpendicular to the drawing paper face. In this case, the port 3' and the reflecting unit 32' are inclined slightly to the drawing paper face.

Hereinafter the forward paths in the fourth embodiment will be described with reference to FIGS. 11A, 11B and 11C.

Figure 11A:
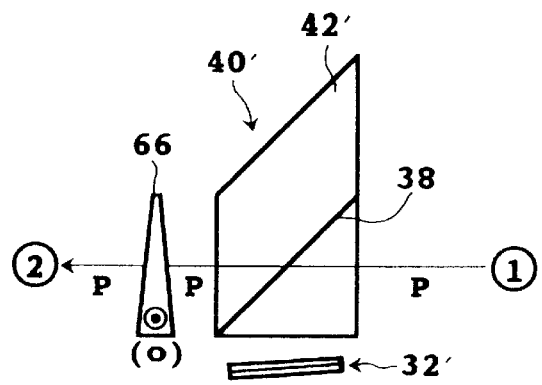
FIGS. 11A to 11C are explanatory diagrams of the operation in the fourth embodiment.

FIG. 11A is a schematic diagram for explaining the path (1, 2). Since each of the beams supplied from the port 1 to the main polarization beam splitter 40' is a P polarized beam, the beams are transmitted through the polarized-wave separating film 38, then are refracted by the double refraction wedge plate 66 and are outputted from the port 2. As the P polarized beams correspond to the ordinary light component (o) in the double refraction wedge plate 66, the refraction angle thereof is relatively small. (In the diagram, the ordinary light component (o) is illustrated without any refraction.)

Figure 11B:
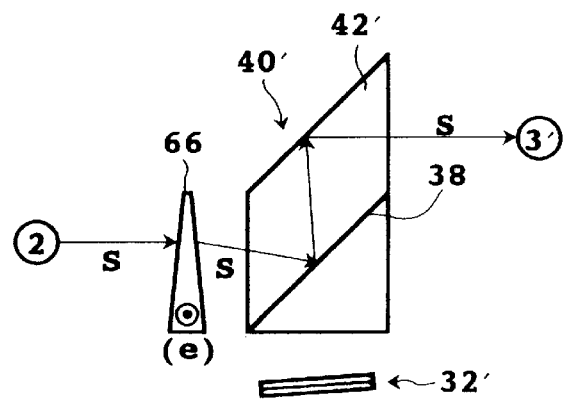

Referring to FIG. 11B, there is shown the path (2, 3'). Since each of the beams supplied from the port 2 to the double refraction wedge plate 66 is an S polarized beam, the beams are refracted to a relatively great degree as the extraordinary light components (e) in the double refraction wedge plate 66. The S polarized beams outputted from the double refraction wedge plate 66 are reflected by the polarized-wave separating film 38 and, after being further reflected by the total reflecting plane of the prism 42', the beams are outputted from the port 3'.

Figure 11C:
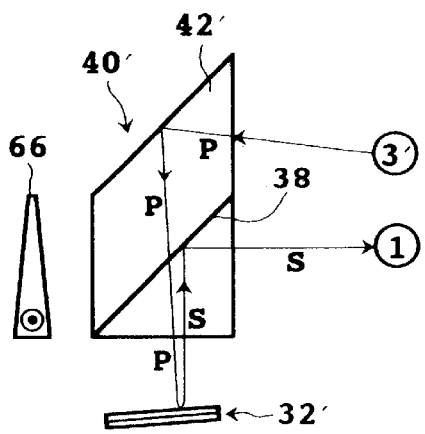

Referring next to FIG. 11C, there is shown the path (3', 1). Since each of the beams supplied from the port 3' to the main polarization beam splitter 401 is a P polarized beam, the beams are reflected by the total reflecting plane of the prism 42' and, after transmission through the polarized-wave separating film 38, the beams are supplied to the reflecting unit 32'. The P polarized beams are converted into S polarized beams by the reflecting unit 32', and subsequently the S polarized beams are reflected by the polarized-wave separating film 38 and then are outputted from the port 1.

Each of the forward paths is ensured in this manner, so that the forward losses are uniformly small as in any of the aforementioned embodiment and are not dependent on the polarization state of the input.

Figure 12A:
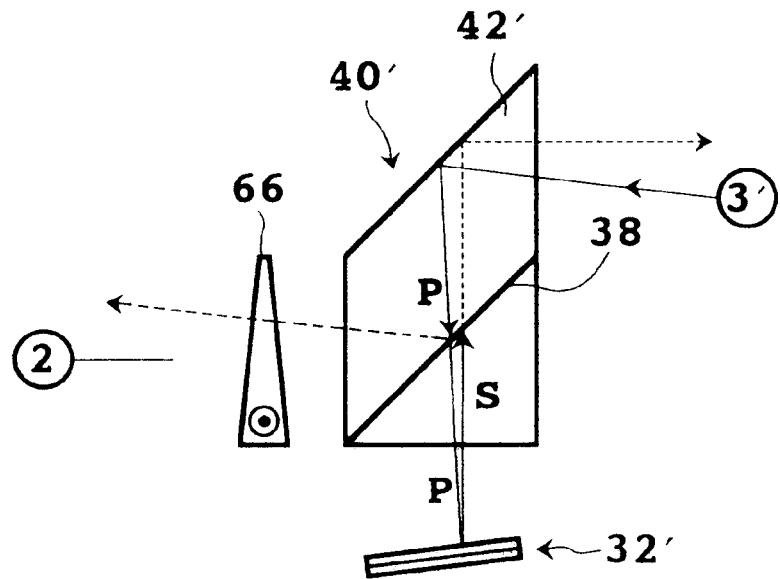
FIGS. 12A and 12B are explanatory diagrams of the advantages achieved in the fourth embodiment.
Figure 12B:
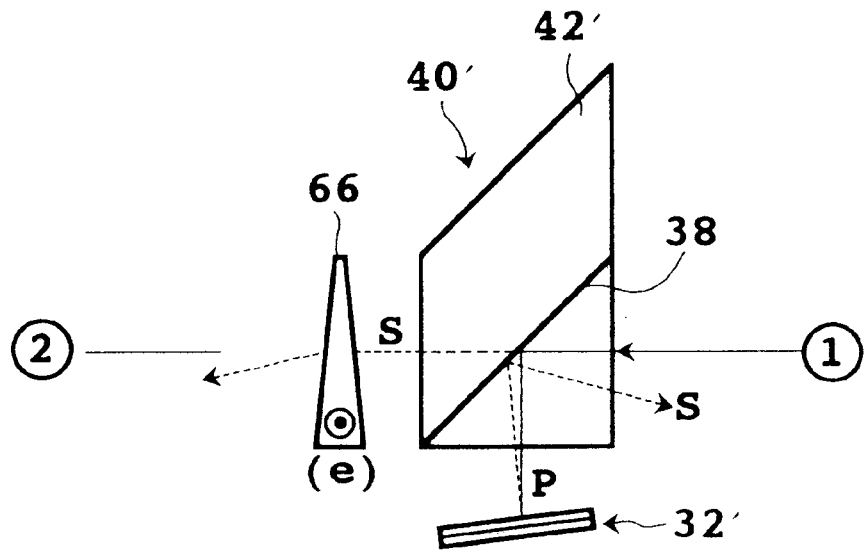

Now the advantages attained in the fourth embodiment will be described below with reference to FIGS. 12A and 12B. As shown in FIG. 12A, even if the P polarized beam from the port 3' is slightly reflected by the polarized-wave separating film 38, the reflected beam is not coupled to the port 2 due to the inclination of the port 3' and the existence of the double refraction wedge plate 66. Further, even if the S polarized beam from the reflecting unit 32' is slightly transmitted through the polarized-wave separating film 38, the transmitted beam is not returned to the port 3' due to the inclination of the port 3' and the reflecting unit 32'. Consequently, a high extinction ratio can be obtained by sufficiently increasing the loss in the path (3', 2). As shown in FIG. 12B, the beam from the port 1 is a P polarized beam in principle, but if any slight amount of an S polarized beam is mixed therein, the S polarized beam may be transmitted through the polarized-wave separating film 38. However, the transmitted beam is refracted as an extraordinary light component (e) in the double refraction wedge plate 66, so that the refracted beam is not coupled to the port 2. Moreover, even if the P polarized beam from the port 1 is slightly reflected by the polarized-wave separating film 38, the reflected beam is converted into an S polarized beam by the reflecting unit 32'. Therefore, although the S polarized beam is reflected by the polarized-wave separating film 38, the reflected beam is not returned to the port 1 due to that the reflecting unit 32' is inclined.

Thus, according to the fourth embodiment where the double refraction wedge plate 66 is employed, the extinction ratio can be enhanced. Further, since the ports 1 and 3' are disposed on the same side, the optical circulator can be installed with facility.

As shown in FIG. 10, the double refraction wedge plate 66 is interposed between the main polarization beam splitter 40' and the optical coupling unit 30 (#2). However, the double refraction wedge plate 66 may be interposed between the main polarization beam splitter 40' and the optical coupling unit 30 (#1).

Figure 13A:
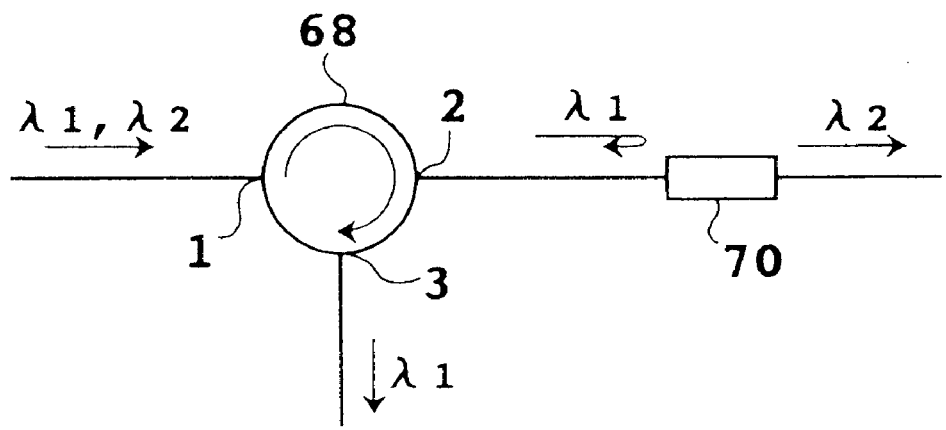
FIGS. 13A and 13B are diagrams showing embodiments of optical add/drop circuits.
Figure 13B:
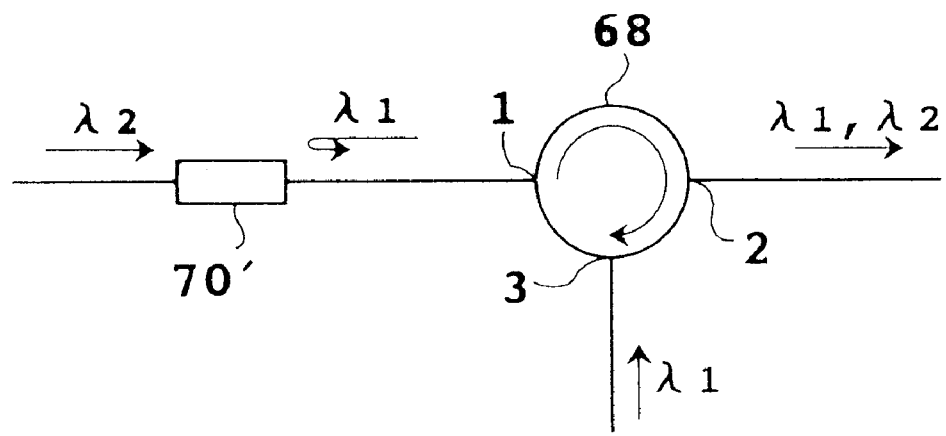

Referring to FIGS. 13A and 13B, there is shown an optical add/drop circuits each using a three-port optical circulator of the present invention. In one example of FIG. 13A a fiber grating 70 is connected to the port 2 of the three-port optical circulator 68 of the present invention. And in another example of FIG. 13B, a fiber grating 70' is connected to the port 1 of the three-port optical circulator 68 of the present invention.

Generally, when the refractive index of an optical medium (e.g., glass) is changed permanently by irradiation of light, the optical medium is termed photosensitive. A fiber grating is producible in a core of an optical fiber by utilizing such physical property. The feature of such a fiber grating resides in causing Bragg reflection of the light in a narrow band proximate to a certain resonance wavelength which is determined by the pitch of the grating and the effective refractive index of a fiber mode. A fiber grating is produced by irradiating an excimer laser beam of an adequate wavelength to a fiber with the use of a phase mask for example.

In FIG. 13A, two-channel optical signals of wavelengths $\lambda_1$ and $\lambda_2$ ($\neq \lambda_1$) are supplied to the port 1. The reflection wavelength of the fiber grating 70 is set to $\lambda_1$. The optical signal of the wavelength $\lambda_1$ outputted from the port 2 is reflected by the fiber grating 70, and the reflected beam is returned to the port 2 and then is outputted from the port 3. Meanwhile the optical signal of the wavelength $\lambda_2$ is outputted from the port 2 and then is transmitted through the fiber grating 70. Therefore, dropping the optical signal of the wavelength $\lambda_1$ can be performed by connecting the ports 1 and 2 to intermediate positions in an optical fiber transmission line where WDM (wavelength division multiplexing) is applied.

In case the optical circulator 68 is the one using a conventional four-port optical circulator, the loss in the path (3, 1) is rendered great as mentioned, so that OTDR (optical time-domain reflectometry) may fail to be carried out completely. OTDR is an important technique for detecting any faulty point (incomplete connection, broken point, etc.) in an optical fiber transmission line and specifying the position thereof, or for measuring the loss in the optical fiber transmission line. More concretely, OTDR evaluates the internal state of the fiber on the basis of the temporal change of the reflected light to optical pulses.

According to the embodiment of FIG. 13A where the loss in the path (3, 1) is sufficiently reducible, satisfactory OTDR can be executed with respect to the optical fiber transmission line connected to the port 3 by using light of the wavelength $\lambda_1$. In this case, light of the wavelength $\lambda_1$ is supplied to the optical circulator 68 from a terminal equipment or the like connected to the port 1. The light outputted from the port 2 is reflected by the fiber grating 70 and then is sent to the optical fiber transmission line by way of the ports 2 and 3 in this order, and the reflected light due to any faulty point and so forth is returned to the terminal equipment or the like by way of the ports 3 and 1 in this order.

In the embodiment of FIG. 13B, an optical signal of the wavelength $\lambda_2$ is supplied to the port 1 through the fiber grading 70'. Meanwhile an optical signal of the wavelength $\lambda_1$ is supplied to the port 3. The optical signal of the wavelength $\lambda_1$ outputted from the port 1 is reflected by the fiber grating 70 and then is returned to the port 1. Consequently, the optical signals of the wavelengths $\lambda_1$ and $\lambda_2$ are both outputted from the port 2. Therefore, adding the optical signal of the wavelength $\lambda_1$ can be performed by connecting the ports 1 and 2 to intermediate positions in the optical fiber transmission line. Also in this embodiment where the loss in the path (3, 1) is sufficiently small, satisfactory OTDR can be executed with respect to the optical fiber transmission line connected to the port 2 by using light of the wavelength $\lambda_1$.

Figure 14:
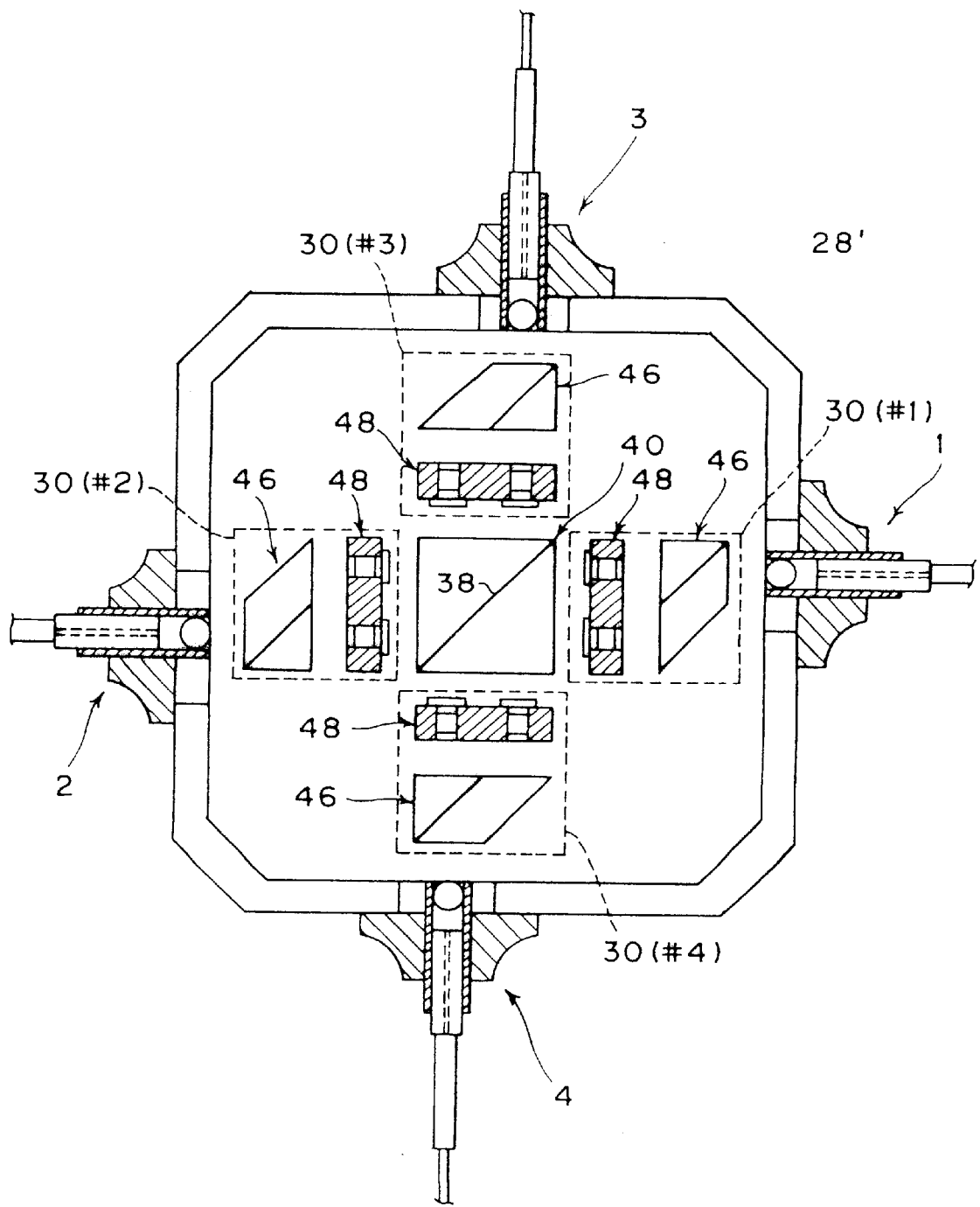
FIG. 14 is a partially sectional view showing an embodiment of a four-port optical circulator of the present invention.

Referring to FIG. 14, there is shown an embodiment of a four-port optical circulator of the present invention. The feature of this embodiment resides in a configuration where the reflecting unit 32 employed in the first embodiment of FIG. 2 is omitted, and instead a port 4 and an optical coupling unit 30 (#4) are provided. Accordingly, the shape of a housing 28' is modified. The port 4 is structurally the same as any of other ports 1, 2 and 3. And the optical coupling unit 30 (#4) has a subsidiary polarization beam splitter 46 and a polarization converter unit 48, similarly to any of other optical coupling units 30 (#1, #2 and #3). The relationship between the component elements of the optical coupling unit 30 (#4) and those of the optical coupling unit 30 (#3) is the same as the relationship between the component elements of the optical coupling unit 30 (#2) and those of the optical coupling unit 30 (#1). An explanation on the operation of the four-port optical circulator is omitted here, since it will be understood with facility in conformity to the operation of the three-port optical circulator shown in FIG. 2. In the embodiment of FIG. 14, a polarization converter unit used therein may be the one shown in FIG. 6, so that it becomes possible to realize easy manufacture and smaller structural dimensions.

According to the present invention, as described hereinabove, an advantageous effect is achievable in providing an improved optical circulator (particularly a three-port optical circulator) where forward losses are uniformly small while reverse losses are uniformly great. Further according to the present invention, another advantageous effect is achievable in providing an improved optical circulator adapted for easier manufacture and reduced structural dimensions.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical device having first to third ports, comprising:

first to third optical coupling units connected optically to said first to third ports, respectively;

a reflecting unit for rotating a polarization plane of an input beam 90°; and a main polarization beam splitter having a polarized-wave separating film for optically connecting said first to third optical coupling units and said reflecting unit through transmission and reflection;

each of said first to third optical coupling units comprising:

a subsidiary polarization beam splitter for coupling a beam of light travelling through the individual relevant port with a first polarized beam having a first polarization plane and a second polarized beam having a polarization plane perpendicular to said first polarization plane; and a polarization-converter for converting one of said first and second polarized beams, the first through third optical coupling units being optically connected to the reflecting unit and main polarization beam splitter in such a manner that said first and second polarized beams are transmitted through said polarized-wave separating film in a direction from said first optical coupling unit toward said second optical coupling unit and also in a direction from said third optical coupling unit toward said reflecting unit, but said first and second polarized beams are reflected by said polarized-wave separating film in a direction from said second optical coupling unit toward said third optical coupling unit and also in a direction from said reflecting unit toward said first optical coupling unit.

2. An optical device according to claim 1, wherein each of said first to third ports comprises an optical fiber having an end, and a lens disposed opposite to said end.

3. An optical device according to claim 1, wherein each of said subsidiary polarization beam splitters comprises a second polarized-wave separating film, and a triangular prism and a parallelogrammic prism for holding said second polarized-wave separating film from both sides thereof.

4. An optical device according to claim 1, wherein each of said subsidiary polarization beam splitters comprises a double refraction plate.

5. An optical device according to claim 1, wherein each of said polarization-converters comprises a pair of magneto-optical crystals each having a Faraday rotation angle of 45°, and a pair of half-wave plates disposed opposite to said magneto-optical crystals respectively;

wherein said pair of half-wave plates have optical axes forming an angle of 45° with each other.

6. An optical device according to claim 1, wherein said first and second polarized beams are parallel with each other.

7. An optical device according to claim 1, wherein said main polarization beam splitter further has a pair of triangular prisms for holding said polarized-wave separating film from both sides thereof.

8. An optical device according to claim 1, wherein said main polarization beam splitter further has a triangular prism and a parallelogrammic prism for holding said polarized-wave separating film from both sides thereof, whereby said first and third ports are disposed on the same side with respect to said main polarization beam splitter.

9. An optical device according to claim 1, further comprising a double refraction plate interposed between said main polarization beam splitter and said reflecting unit.

10. An optical device according to claim 1, further comprising a double refraction wedge plate interposed between one of said first and second optical coupling units and said main polarization beam splitter.

11. An optical device according to claim 1, wherein said reflecting unit comprises a mirror and a quarter-wave plate interposed between said mirror and said main polarization beam splitter.

12. An optical device according to claim 1, further comprising a fiber grating connected optically to at least one of said first to third ports.

* * * * *

UNITED STATES PATENT AND TRADEMARK OFFICE
CERTIFICATE OF CORRECTION

PATENT NO.: 5,999,313
DATED : December 7, 1999
INVENTOR(S): Nobuhiro FUKUSHIMA

It is certified that error appears in the above-identified patent and that said Letters Patent is hereby corrected as shown below:

On the Title Page:

[56] References Cited Section, U.S. Patent Documents
Replace "5,878,178" with --5,878,176--.

Signed and Sealed this

Fifteenth Day of August, 2000

Attest:

Q. TODD DICKINSON

Attesting Officer    Director of Patents and Trademarks